(12) United States Patent
Kato et al.

(10) Patent No.: US 6,190,059 B1
(45) Date of Patent: Feb. 20, 2001

(54) CAMERA

(75) Inventors: Koji Kato, Tama; Setsuya Kataoka, Hachioji; Kunio Yokoyama, Hino; Tatsuya Suzuki, Tokyo; Keita Takahashi, Kanagawa, all of (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 09/243,525

(22) Filed: Feb. 1, 1999

(30) Foreign Application Priority Data

Feb. 3, 1998 (JP) ................................................. 10-022220

(51) Int. Cl.$^7$ ............................... G03B 1/00; G03B 17/02
(52) U.S. Cl. ........................... 396/418; 396/538; 396/541
(58) Field of Search .................................... 396/541, 538, 396/72, 85, 387, 388, 411, 418

(56) References Cited

U.S. PATENT DOCUMENTS 5,854,952 * 12/1998 Terada ................................... 396/418
6,039,476 * 3/2000 Katagiri et al. ...................... 396/418

FOREIGN PATENT DOCUMENTS 8313791    11/1996  (JP) .

* cited by examiner

*Primary Examiner*—David M. Gray
(74) *Attorney, Agent, or Firm*—Ostrolenk, Faber, Gerb & Soffen, LLP

(57) ABSTRACT

In a camera body section of a camera according to the present invention, a cartridge chamber unit and a spool chamber unit are located on a lower connecting member with a lens barrel unit as a central unit. Furthermore, a driving-force transfer mechanism is located under the lower connecting member. An output of a driving motor located inside the spool chamber is transferred to the lens barrel unit, cartridge chamber unit, and spool chamber unit through a driving-force transfer mechanism by changing the unit receiving the output. In particular, the driven sections of the lens barrel unit and cartridge chamber unit are driven through a worm gear. According to this camera, it requires a minimum change of each unit section to accommodate a specification change and/or a model change. In addition, it is easy to perform partial assembly of every unit.

15 Claims, 14 Drawing Sheets

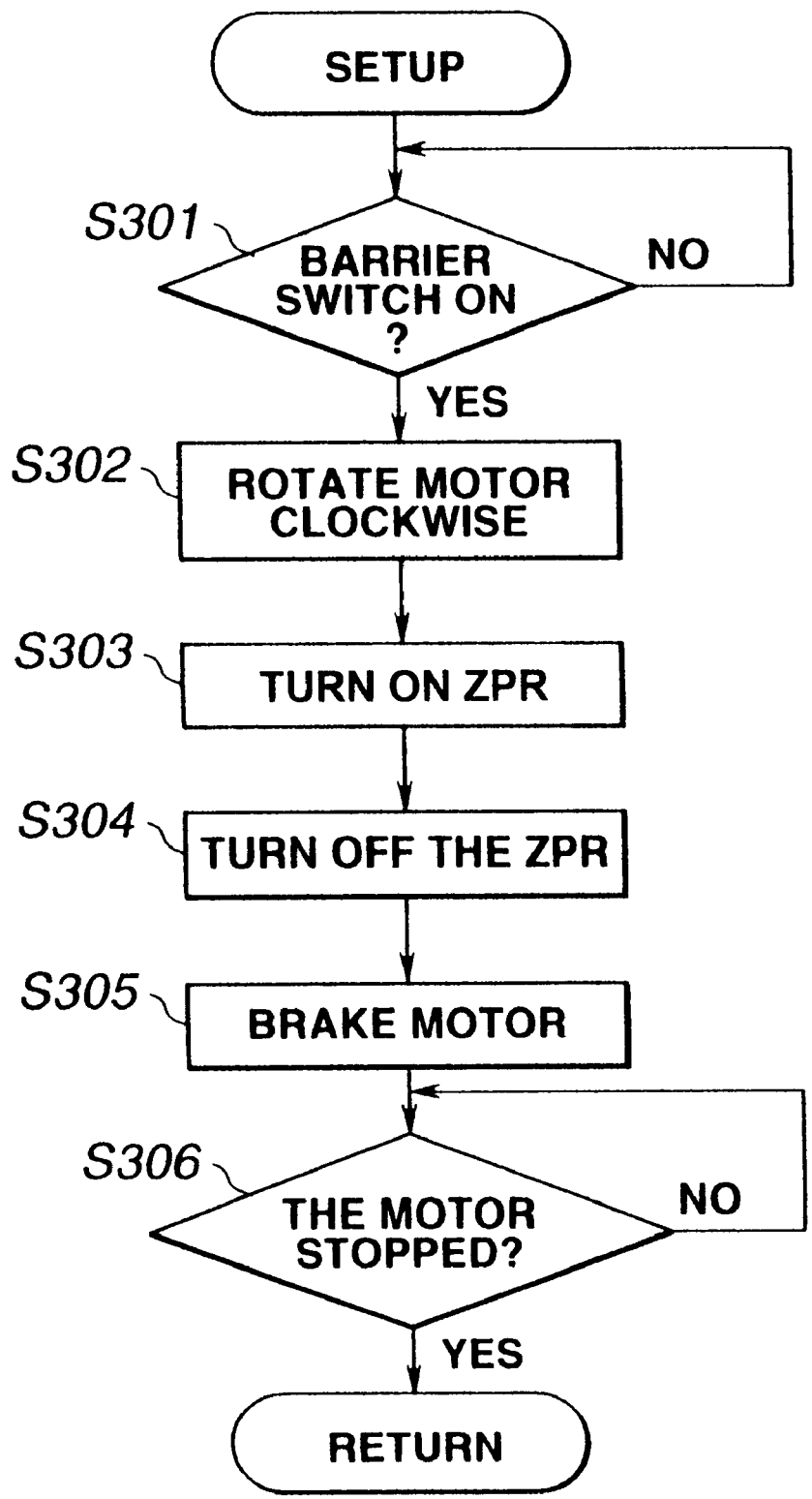

CAMERA

BACKGROUND OF THE INVENTION

1. Field of the Invention

The present invention relates to a camera that performs various operations for picture-taking by performing change-over of an output of a single driving source.

2. Description of the Related Art

Heretofore, a camera as disclosed in Japanese Unexamined Patent Publication No. 8-313791 has been proposed to perform various operations for picture-taking by performing change-over of an output of a single driving source. In the camera, the motor, which is the single driving source, is transferred to different corresponding sections of a lens barrel for zoom-in and zoom-out operations, and to a film-windup part in a spool chamber or to a film-rewind part in a cartridge chamber to perform the designated operation. A clutch mechanism and a plurality of gear trains connect the motor to the respectively driven sections.

Nevertheless, in the camera disclosed in the Japanese Unexamined Patent Publication No. 8-313791, sections including the drivable section of the lens barrel, and drivable sections in the spool chamber and cartridge chamber are not unitized. Furthermore, the clutch mechanism and respectively drivable sections are connected by a plurality of gear trains.

Therefore, if the specifications for one of the drivable sections is changed, the entire design of the camera must be changed. Hence, a significant amount of time and cost is required to change the specifications and design of a camera. In addition, in an assembly process of the drivable sections, an inefficient use of labor is expended to assemble the parts of every unit.

SUMMARY OF THE INVENTION

The present invention is performed in consideration of the above problems and provides a camera that requires only a minimum of change to a section of each unit even when the specifications or the model changes, and has a construction such that parts assembly of every unit is also easy.

A camera of the present invention which is used for recording a subject image on a film with an image pickup lens comprises a driving source; spool chamber unit having a film spool chamber and a first driving-force transfer means for winding a film up; a cartridge chamber unit having a cartridge chamber where a film cartridge is loaded; a second driving-force transfer means for rewinding the film; a lens barrel unit having a third driving-force transfer means held in a fixed frame for driving a lens holding barrel to hold the image pickup lens and to move back and forth freely; and a connecting member having a driving-force transfer mechanism for transferring the driving-force of the driving source while remaining connected to at least the second and third driving-force transfer means.

In the above-described camera, when the spool chamber unit, cartridge chamber unit, and lens barrel unit are mounted in the connecting member directly or indirectly, the second and third driving-force transfer means are connected with the driving-force transfer mechanism. In addition, if any unit is dismounted from the connecting member, the connection between the driving-force transfer mechanism and the driving-force transfer means of the unit dismounted is released.

Other features and advantages of the present invention will be fully apparent from the following description.

BRIEF DESCRIPTION OF THE DRAWINGS

FIG. 13 is a flow chart showing setup processing of the zoom lens barrel in the camera of the above-described embodiment.

DETAILED DESCRIPTION OF THE PREFERRED EMBODIMENT

Hereinafter, an embodiment of the present invention will be described with reference to the drawings.

Figure 1:
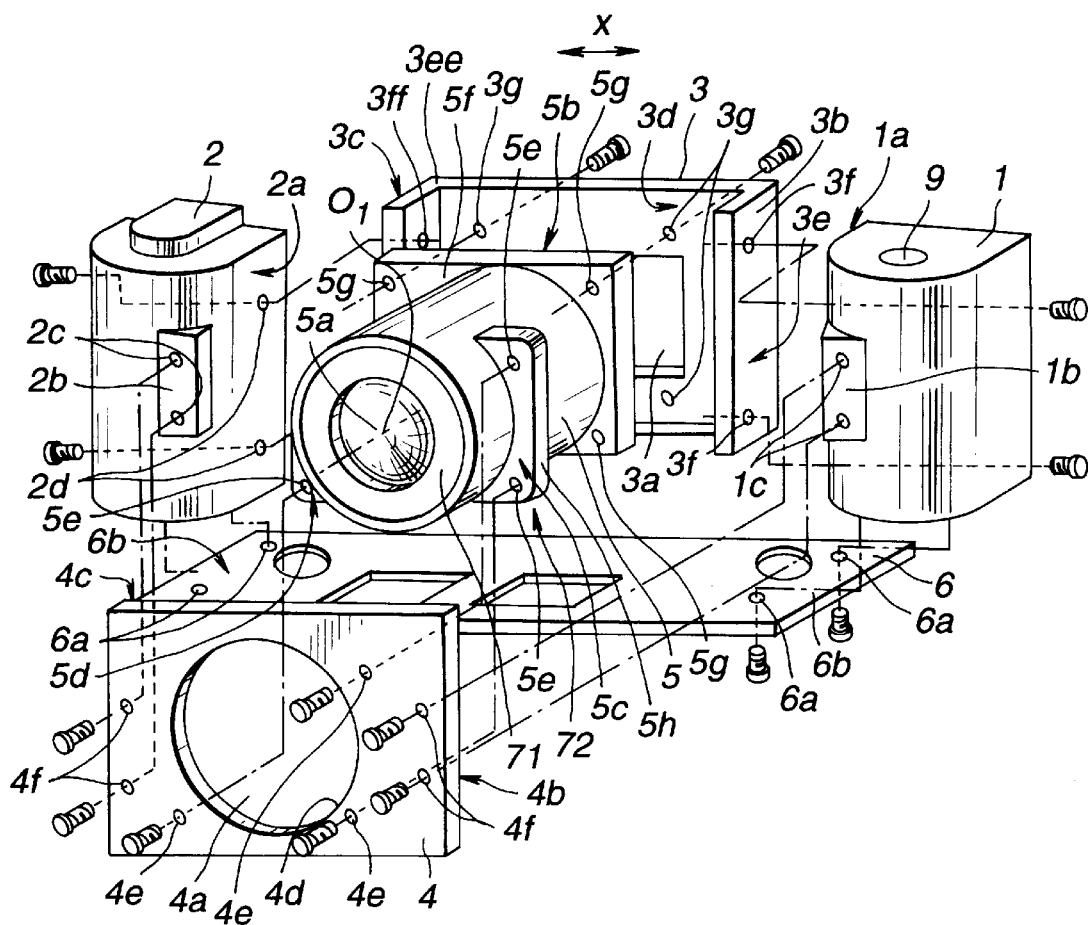
FIG. 1 is an exploded perspective view showing a camera body section of a camera that is an embodiment of the present invention.
Figure 2:
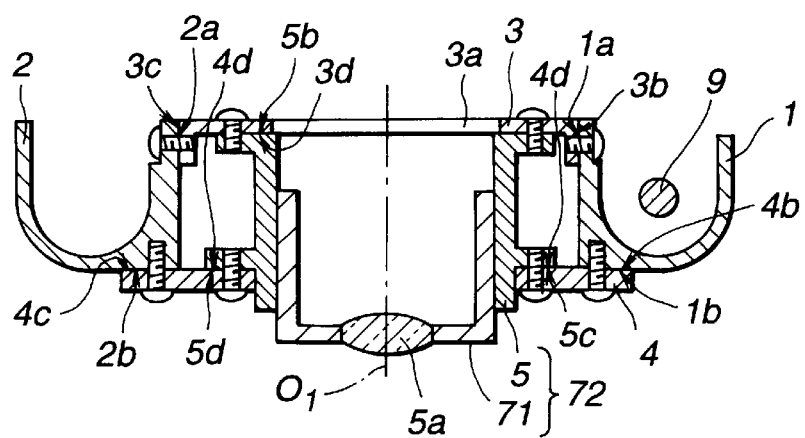
FIG. 2 is a horizontal sectional view showing the camera body of the above-described embodiment.

FIG. 1 is an exploded perspective view showing a camera body section of a camera in a preferred embodiment of the present invention, and FIG. 2 is a horizontal cross-sectional view showing the camera body section.

The camera body section as shown in FIG. 1 comprises a spool chamber unit 1 forming a spool chamber where a spool shaft 9 for winding a roll of used film is rotatably provided;

a cartridge chamber unit 2 forming a cartridge chamber where a film cartridge (not shown) containing a photosensitive roll of unused film is loaded; a rail member 3 that has an aperture 3a and guide-rails (not shown) and is a nearly tabular connecting member (a first connecting member) connecting the spool chamber unit 1, cartridge chamber unit 2, and a body 5 of a lens barrel unit; the lens barrel unit 72 comprising a zoom lens barrel 71 and the body 5 of the lens barrel unit supporting the zoom lens barrel 71; a connection reinforcing member 4 that reinforces connection of respective constitutive units from the front side of the camera body and is a nearly tabular connecting member (a second connecting member); and a lower connecting member 6 that reinforces connection of respective constitutive units from the bottom side of the camera body and is a slender and nearly tabular connecting member (a third connecting member). In the lower connection reinforcing member 6, holes for accommodating gears of a driving-force transfer mechanism and the like are formed.

In addition, in the zoom lens barrel 71, a picture-taking optical system such as a picture-taking lens 5a is incorporated. Furthermore, a fixed frame 61 (FIGS. 9A and 9B) of the zoom lens barrel 71 which will be described later can be made with the body 5 of the lens barrel unit in one piece.

The rail member 3, as described above, includes at least the aperture 3a located in a generally central part thereof and guide rails provided on the back side thereof. The aperture 3a forms an image plane by allowing a beam from the body 5 of the lens barrel unit to pass therethrough. Furthermore, the guide rails ensure flatness of the film behind the aperture 3a by pressing both side edges in the width direction of the film with a pressure plate (not shown) provided on a back lid (not shown) of the camera and by regulating the position of the film relative to the aperture 3a.

In the connection reinforcing member 4, an opening 4a that has the nearly same shape and size as the outer diameter of the body 5 of the lens barrel unit is formed in a generally central section thereof. Furthermore, three through-holes 4e for mounting the body 5 of the lens barrel unit are provided at predetermined positions around the periphery of opening 4a. Moreover, two through-holes 4f for mounting the connection reinforcing member 4 to the spool chamber unit 1 and cartridge chamber unit 2 are provided at both side edges of the connection reinforcing member 4.

The body 5 of the lens barrel unit is tubular and has a picture-taking lens 5a and the like disposed therein as described above. In addition, a rib section 5h having screw holes 5e corresponding to the through-holes 4e bored therethrough at predetermined positions is provided in one piece at generally central locations the left and right sides of the circumference of the body 5 of the lens barrel unit.

Furthermore, a lens barrel mounting plate 5f that is nearly tabular is mounted to the rear end section of the body 5 of the lens barrel unit. In a generally central section of this lens barrel mounting plate 5f, an opening (not shown) that has nearly the same shape and size as the outer diameter of the body 5 of the lens barrel unit is provided. In addition, four screw holes 5g for mounting the rail member 3 are provided in the four corners of the lens barrel mounting plate 5f. Three holes among the four screw holes 5g are shown in FIG. 1.

The rib section 5h and lens barrel mounting plate 5f of the body 5 of the lens barrel unit can be formed with the body 5 of the lens barrel unit in one piece. Alternatively, they can be bonded together at respectively predetermined locations of the body 5 of the lens barrel unit with bonding means such as an adhesive agent after being formed separately from the body 5 of the lens barrel unit. In each case, the rib section 5h and lens barrel mounting plate 5f of the body 5 of the lens barrel unit are formed so as to be orthogonal to an optical axis $O_1$ of the picture-taking lens 5a.

The rail member 3 has bent sections 3e and 3ee formed by the end sections in the longitudinal direction of the member 3 being bent toward the front. In one bent section 3e, two through-holes 3f for mounting the spool chamber unit 1 are provided, and, in the other bent section 3ee, two through-holes 3ff for mounting the cartridge chamber unit 2 are provided.

In addition, the aperture 3a is formed in a generally central section of the rail member 3 and forms the image plane. Around the circumference of aperture 3a, four through-holes 3g are provided at positions facing the screw holes 5g of the lens barrel mounting plate 5f so that the lens barrel mounting plate 5f of the body 5 of the lens barrel unit can be connected to the rail member 3. Only three through-holes among the four through-holes 3g are shown in FIG. 1.

On the other hand, a connecting section 1b has two screw holes 1c bored therethrough that face the through-holes 4f and that are used for connecting the spool chamber unit 1 to the connection reinforcing member 4. The connecting section 1b is located at the front of the spool chamber unit 1 on the side facing the body 5 of the lens barrel unit.

In addition, two screw holes (not shown) for connecting the spool chamber unit 1 to the rail member 3 are provided in the inner side face of the spool chamber unit 1, that is, the side face facing the body 5 of the lens barrel unit. Furthermore, in the bottom surface, two screw holes (not shown) for holding the spool chamber unit 1 on the lower connecting member 6 are provided.

In the cartridge chamber unit 2, similarly to the spool chamber unit 1, a connecting section 2b is located and has two screw holes 2c that face the through-holes 4f for connecting the cartridge chamber unit 2 to the connection reinforcing member 4. Furthermore, two screw holes 2d for connecting the cartridge chamber unit 2 to the rail member 3 are provided in the inner side face of the cartridge chamber unit 2, that is, the side face facing the body 5 of the lens barrel unit. Moreover, in the bottom surface, two screw holes (not shown) for holding the cartridge chamber unit 2 on the lower connecting member 6 are provided.

In addition, near the left and right side edges of the lower connecting member 6, four through-holes 6a are bored therethrough at the positions facing the screw holes (not shown) provided in the bottom faces of the spool chamber unit 1 and cartridge chamber unit 2, respectively.

The camera body section of the camera of this embodiment is assembled by connecting these constitutive units, formed as described above, to each other.

First, the aperture 4a of the connection reinforcing member 4 is inserted from the front of the body 5 of the lens barrel unit 72 into the body 5 of the lens barrel unit. Subsequently, contact face 4d on the back side of the connection reinforcing member 4 is brought into contact with contact faces 5c and 5d in the front face of the rib section 5h in the body 5 of the lens barrel unit. In this position, the three screw holes 4e of the connection reinforcing member 4 are aligned with the three screw holes 5e of the rib section 5h. Then, the connection reinforcing member 4 is fixed to the body 5 of the lens barrel unit with screws from the front.

Since the front face of the rib section 5h, as described above, is orthogonal to the optical axis $O_1$ of the picture-taking lens 5a, the connection reinforcing member 4 contacting the contact faces 5c and 5d of the rib section 5h is also orthogonal to the optical axis $O_1$ of the picture-taking lens 5a.

In addition, the contact face 5b of the lens barrel mounting plate 5f is brought into contact with the contact face 3d surrounding the circumference of the aperture 3a in the rail member 3. Next, in this state, the four screw holes 5g of the lens barrel mounting plate 5f are aligned with the four through-holes 3g of the rail member 3. In this position, the body 5 of the lens barrel unit is fixed to the rail member 3 with screws from the back side.

The lens barrel mounting plate 5f, similarly to the rib section 5h, is also formed so as to be orthogonal to the optical axis $O_1$ of the picture-taking lens 5a. Therefore, the rail member 3 contacting the contact face 5b of the lens barrel mounting plate 5f is also orthogonal to the optical axis $O_1$ of the picture-taking lens 5a.

The spool chamber unit 1 is connected to the bent section 3e of the rail member 3. Thus, by contacting the contact face 3b of the bent section 3e to the contact face 1a of the inner side of the spool chamber unit 1, the two through-holes 3f of the bent section 3e are aligned with the two screw holes (not shown) of the spool chamber unit 1. Then, the spool chamber unit 1 is connected to the rail member 3 with screws from the inside of the spool chamber unit 1.

The bent section 3e, as described above, is bent toward the front at a right angle to the rail member 3. Thus, the contact face 3b of the bent section 3e is formed so as to be parallel to the optical axis $O_1$ of the picture-taking lens 5a and orthogonal to the film-feeding direction X (FIG. 1). Therefore, the spool chamber unit 1 contacting the contact face 3b of the bent section 3e is connected so as to be parallel to the optical axis $O_1$ of the picture-taking lens 5a and orthogonal to the film-feeding direction X.

Furthermore, the contact face 1b of the connecting section 1b of the spool chamber unit 1 contacts the contact face 4b of the connection reinforcing member 4, and the two screw holes 1c of the connecting section 1b are aligned with the two through-holes 4f of the connection reinforcing member 4. In this state, the connection reinforcing member 4 and spool chamber unit 1 are connected with screws from the front.

The connection reinforcing member 4, as described above, is oriented so as to be orthogonal to the optical axis $O_1$ of the picture-taking lens 5a. In addition, the contact face of the connecting section 1b of the spool chamber unit 1 also is orthogonal to the optical axis $O_1$ of the picture-taking lens 5a. Therefore, the spool chamber unit 1 is oriented orthogonally to the optical axis $O_1$ of the picture-taking lens 5a.

In addition, the cartridge chamber unit 2 is connected to the other bent section 3ee of the rail member 3. Thus, with the contact face 3c of the bent section 3ee contacting the contact face 2a on an inner side of the cartridge chamber unit 2, two through-holes 3ff of the bent section 3ee are aligned with two screw holes 2d of the cartridge chamber unit 2. In this state, the cartridge chamber unit 2 and rail member 3 are connected to each other with screws from the inside of the cartridge chamber unit 2.

The bent section 3ee, as described above, similarly to the bent section 3e, is bent toward the front at a right angle to the rail member 3. Thus, the contact face 3c of the bent section 3ee and the contact face 2a of the cartridge chamber unit 2 contacting to this face 3c are formed so as to be parallel to the optical axis $O_1$ of the picture-taking lens 5a and orthogonal to the film feeding direction X. Therefore, the cartridge chamber unit 2 is oriented so as to be orthogonal to not only the optical axis $O_1$ of the picture taking lens 5a but also the film feeding direction X.

Furthermore, a contact face of the connecting section 2b of the cartridge chamber unit 2 contacts the contact face 4c on the back side of the connection reinforcing member 4. Moreover, the two screw holes 2c of the connecting section 2b are aligned with the two through-holes 4f of the connection reinforcing member 4. Therefore, the connection reinforcing member 4 and cartridge chamber unit 2 are connected to each other with screws from the front.

The connection reinforcing member 4, as described above, is oriented so as to be orthogonal to the optical axis $O_1$ of the picture-taking lens 5a. In addition, the contact face of the connecting section 2b of the cartridge chamber unit 2 $O_1$ of the picture-taking lens 5a. Therefore, the cartridge chamber unit 2 is orthogonal to the optical axis $O_1$ of the picture-taking lens 5a.

In this manner, the body 5 of the lens barrel unit 72, rail member 3, spool chamber unit 1, cartridge chamber unit 2, and connection reinforcing member 4 are held on the lower connecting member 6.

The bottom faces of the spool chamber unit 1 and cartridge chamber unit 2 contact the contact face 6b on the upper face of the lower connecting member 6. In this position, two screw holes in the bottom face of the spool chamber unit 1 and two screw holes in the bottom face of the cartridge chamber unit 2 are aligned with the four through-holes 6a of the lower connecting member 6. Then, the spool chamber unit 1 and cartridge chamber unit 2 are fixed to the lower connecting member 6 with screws from the bottom.

In addition, a driving motor 11 (FIG. 4B) serving as the driving source for the mechanisms of this camera, as will be described later, is incorporated inside the spool chamber unit 1.

Furthermore, a main part shown in FIGS. 3 and 4 that will be described later is assembled as a driving-force transfer mechanism on the lower connecting member 6 where the respective units are assembled. This driving-force transfer mechanism is for transferring a driving-force generated by the driving motor 11 from one driven unit to another among the cartridge chamber unit 2 (a rewind section), spool chamber unit 1 (a windup section), lens barrel unit 72, and a strobe device. Next, the driving-force transfer mechanism will be described in detail.

Figure 3:
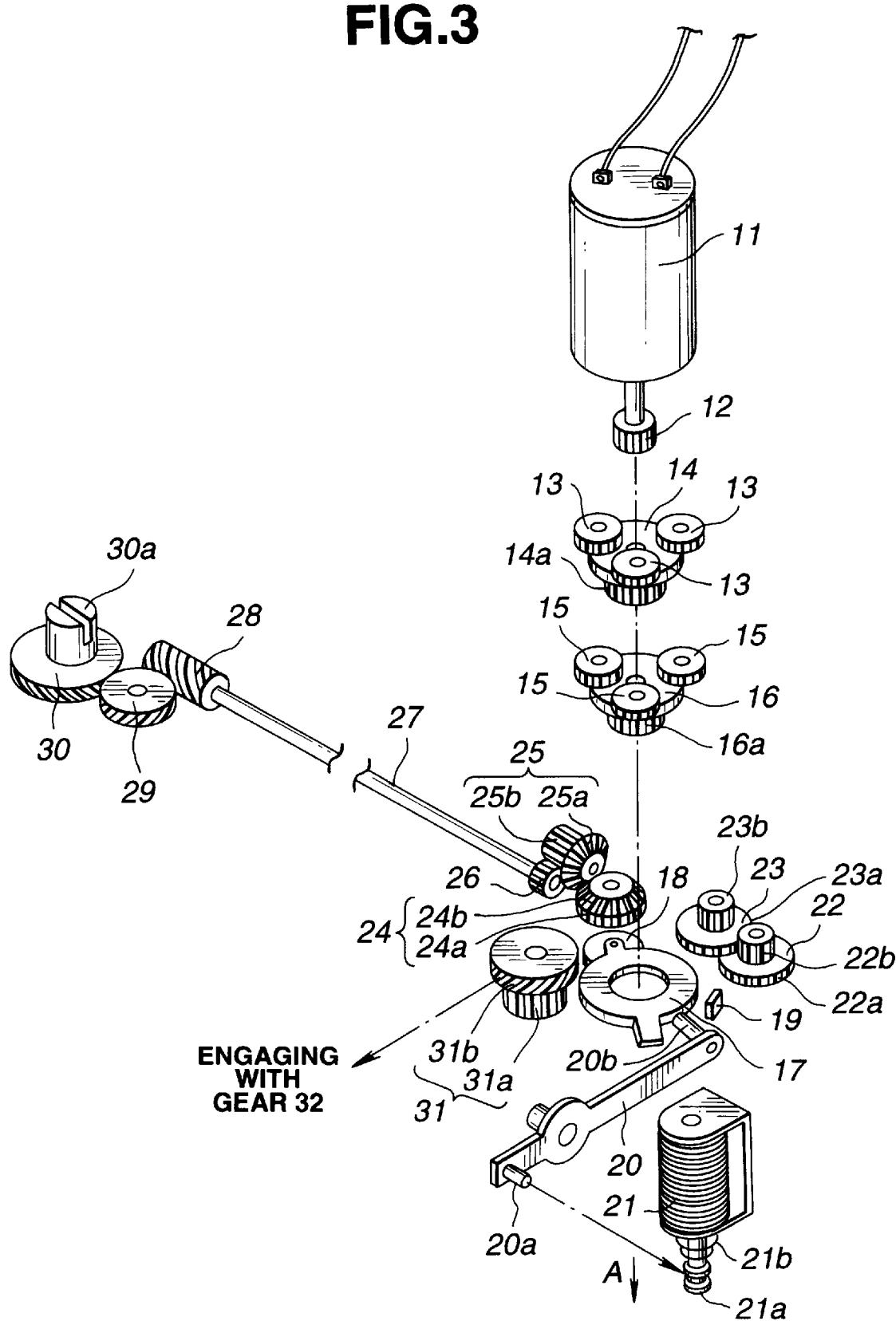
FIG. 3 is a part of an exploded perspective view of a driving-force transfer mechanism provided in the camera of the above-described embodiment.
Figure 4A:
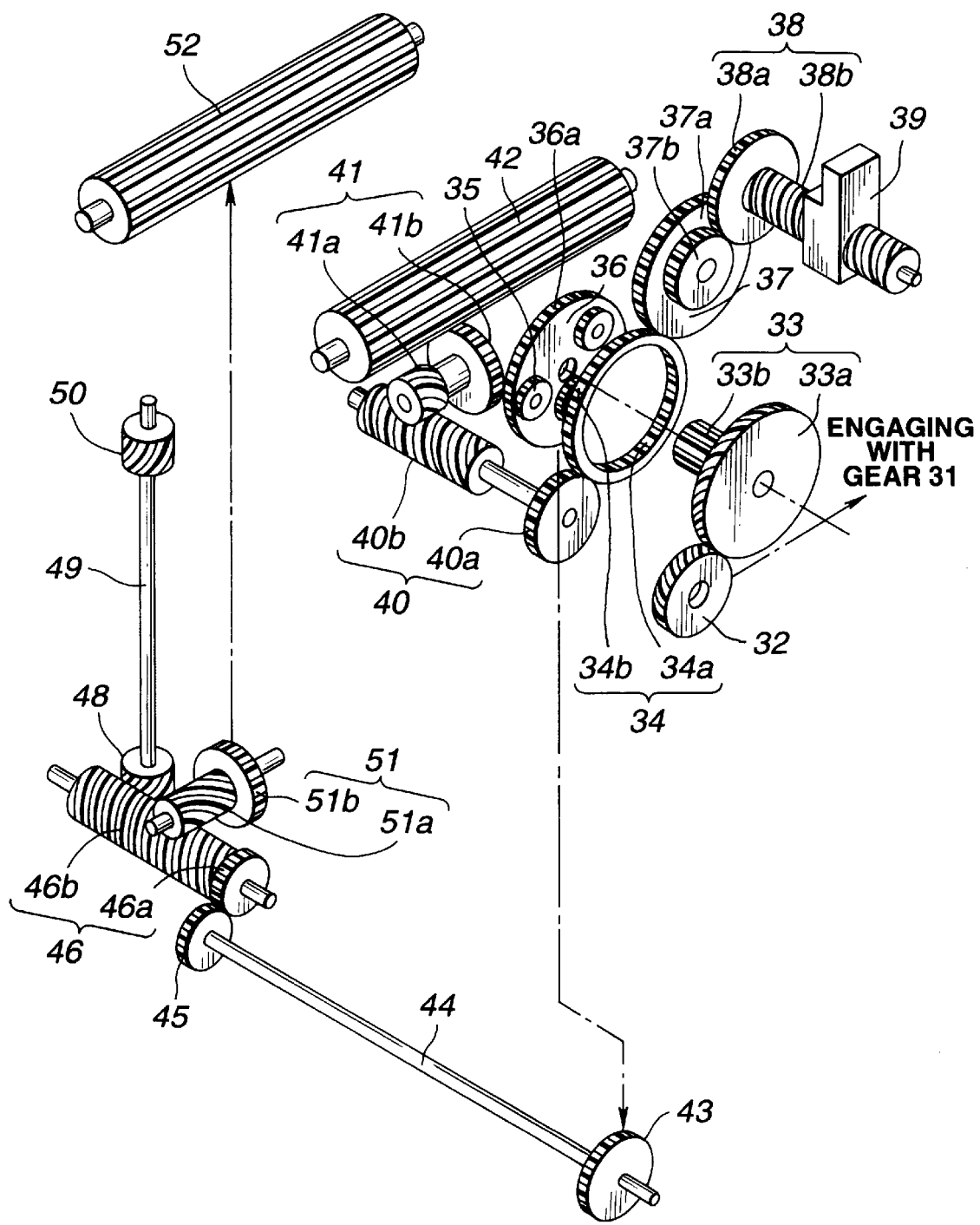
FIG. 4A is a part of an exploded perspective view of the driving-force transfer mechanism provided in the camera of the above-described embodiment.
Figure 4B:
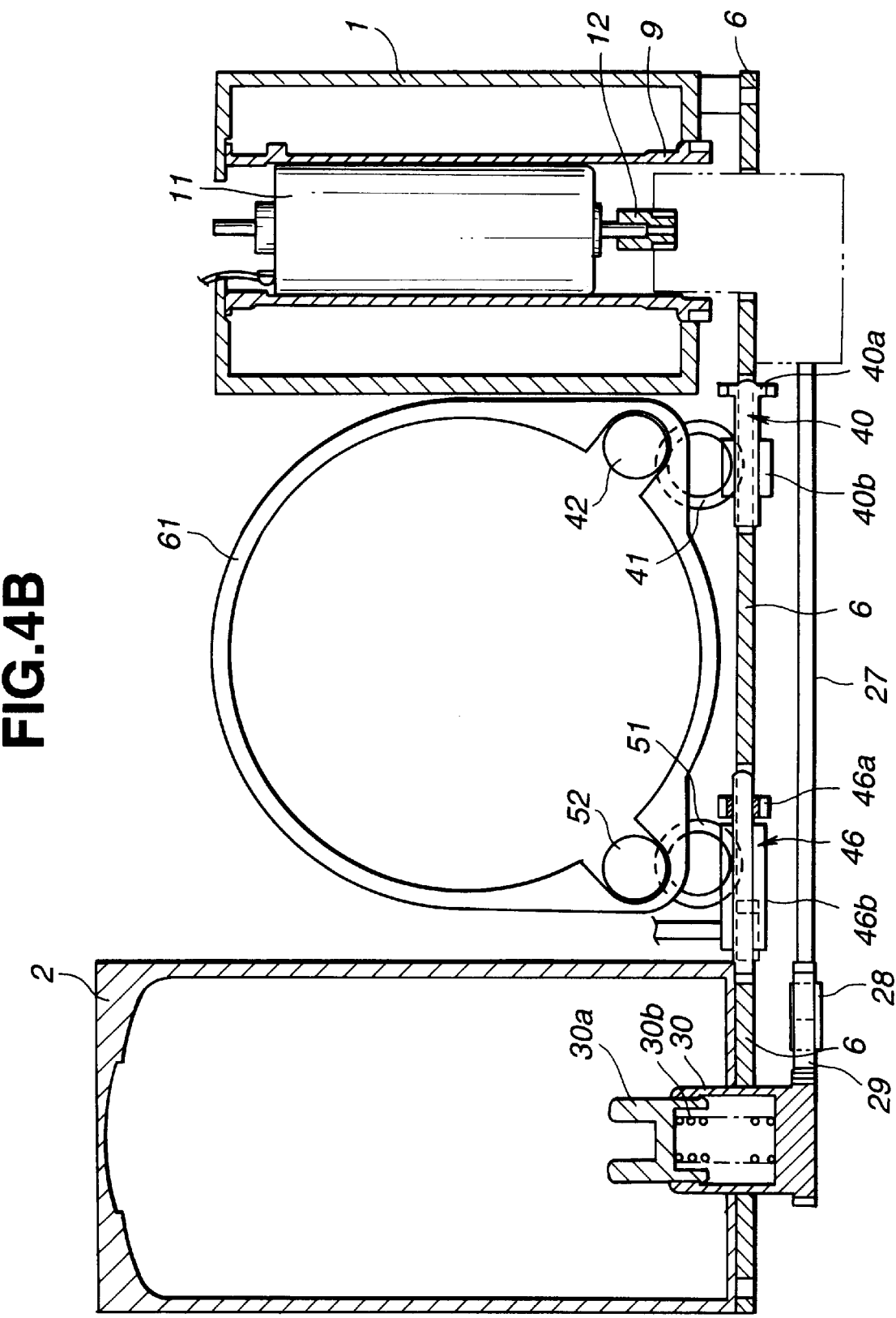
FIG. 4B is a sectional view showing the relationship between respective units and the driving-force transfer mechanism upon viewing the camera body section of the camera from an image pickup lens side.

FIG. 3 is an exploded perspective view showing the driving motor 11 and change-over mechanism section in a driving-force transfer mechanism. FIG. 4A is an exploded perspective view of the change-over mechanism section and other associated mechanisms in the driving-force transfer mechanism shown in FIG. 3. Furthermore, FIG. 4B is a sectional view showing the relationship between the respective units and the driving-force transfer mechanism as viewed from the camera body section of the camera from the side of picture-taking lens 5a.

Figure 5:
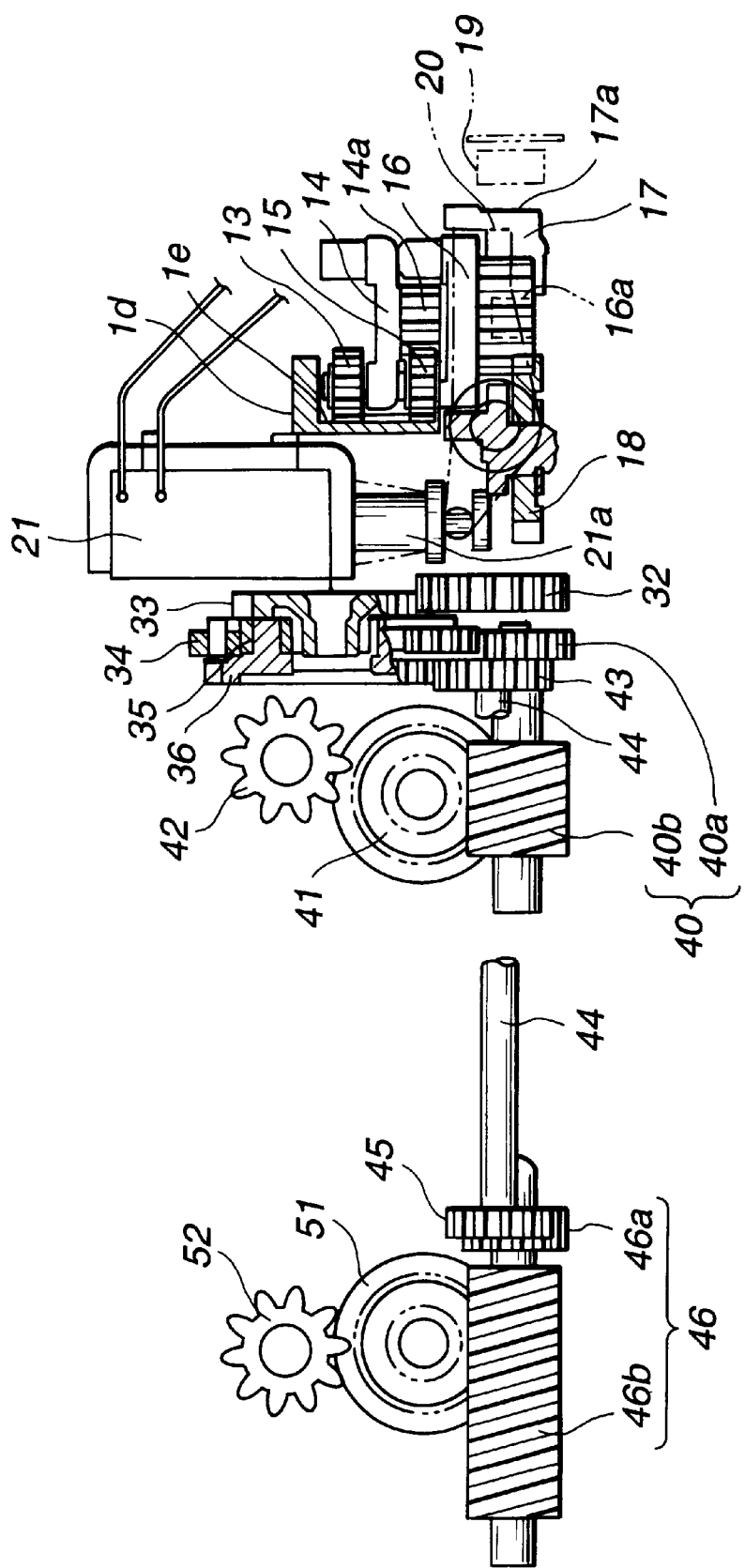
FIG. 5 is a vertical sectional view showing a change-over mechanism section of the driving-force transfer mechanism provided in the camera of the above-described embodiment.
Figure 6:
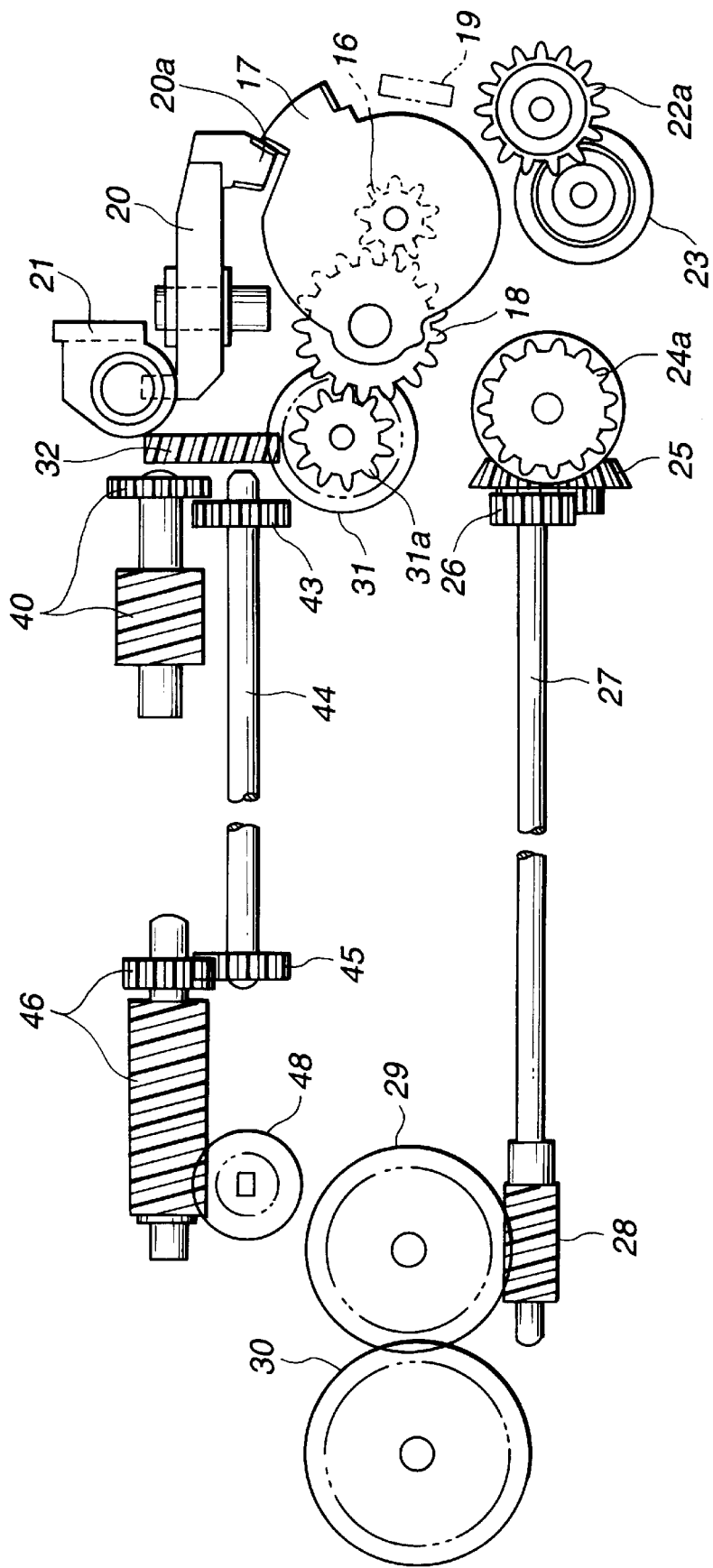
FIG. 6 is a bottom view showing a change-over state of the change-over mechanism section of the driving-force transfer mechanism provided in the camera of the above-described embodiment during a zooming and a set-up driving operations.
Figure 7:
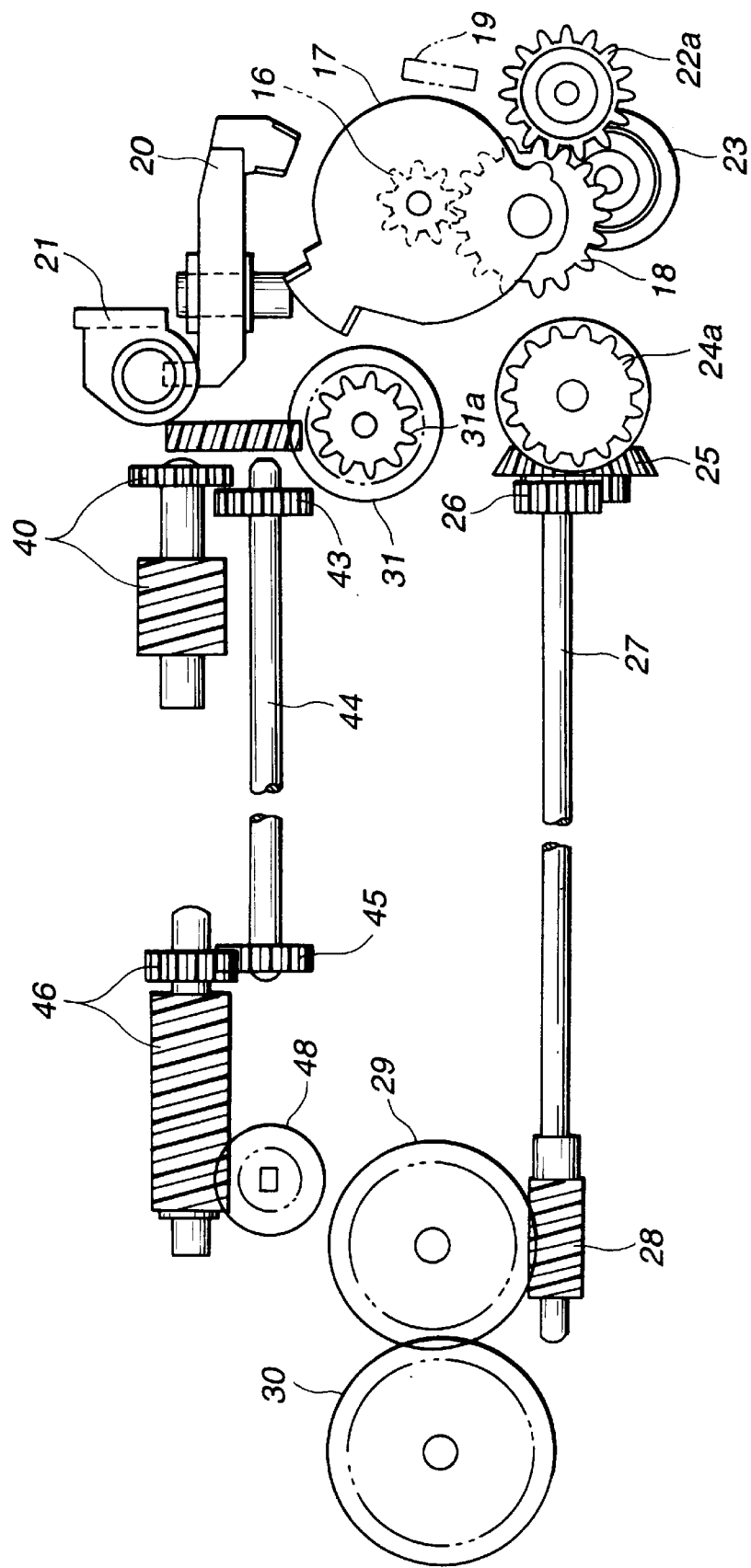
FIG. 7 is a bottom view showing a change-over state of the change-over mechanism section of the driving-force transfer mechanism provided in the camera of the above-described embodiment during a film windup driving operation.
Figure 8:
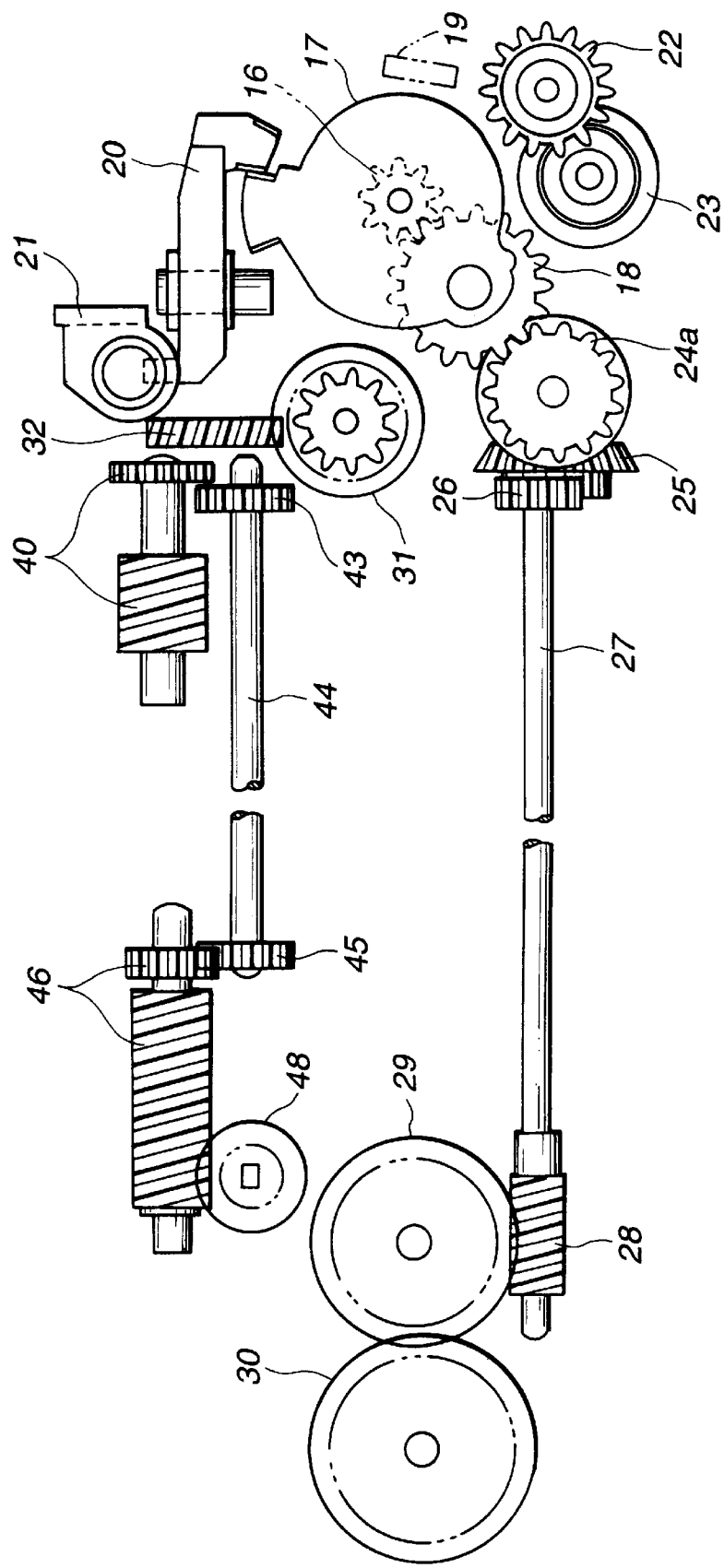
FIG. 8 is a bottom view showing a change-over state of the change-over mechanism section of the driving-force transfer mechanism provided in the camera of the above-described embodiment during a film rewind driving operation.

FIG. 5 is a vertical sectional view showing the driving motor and change-over mechanism section in the driving-force transfer mechanism. In addition, FIGS. 6, 7, and 8 are bottom views showing changing-over states of the changing-over mechanism section as viewed from the bottom. FIG. 6 shows the change-over state at the time of zooming and setup-driving, FIG. 7 shows the change-over state at the time of film windup driving, and FIG. 8 shows the change-over state at the time of film rewind driving.

The construction of the driving system of the driving-force transfer mechanism will be described with reference to FIGS. 3 and 4. The driving motor 11 serving as the driving source for the respectively driven systems is fixedly supported by a base plate 1d (FIG. 5) fixed to the spool chamber unit 1. A pinion gear 12 fixed to the output shaft of the driving motor 11 engages with three planet gears 13 rotatably mounted in a carrier-A 14.

A sun gear 14a fixed to the carrier-A 14 engages with three planet gears 15 rotatably mounted in a carrier-B 16. In addition, a sun gear 16a is fixed to the carrier-B 16. The planet gears 13 and 15 engage with an internal gear 1e (FIG. 5) provided in the base plate 1d of the spool chamber unit 1. The planet gears 13, sun gear 14a, planet gears 15, sun gear 16a, and internal gear 1e thus constitute a planet reduction gear mechanism whose output gear is the sun gear 16a.

The sun gear 16a of the carrier-B 16 always engages with a planet gear 18 provided in an end section of a rotatably supported carrier arm 17. The planet gear 18 is rotatably mounted in the carrier arm 17 with friction, and is supported in a manner in which the gear 18 can perform rotation and revolution.

The clutch lever 20 is supported so as to be capable of rocking by the spool chamber unit 1 and has pins 20a and 20b. The pin 20a engages with a movable iron core 21a of a magnetic plunger 21. The clutch lever 20 rocks in accordance with the attraction and release of the movable iron core 21a by turning the plunger 21 on and off. In addition, the movable iron core 21a is energized in the direction A by a spring 21b.

When the plunger 21 is turned on, the clutch lever 20 rotates to a position at which the pin 20b is released from engagement with the carrier arm 17, and hence, the carrier arm 17 can rotate counterclockwise or clockwise. According to a rotational position of the carrier arm 17, the planet gear 18 engages with any one of double-gears 31, 22, and 24.

Thus, when the carrier arm 17 is at the position to regulate counterclockwise rotation, the planet gear 18 engages with a spur gear portion 31a of the double-gear 31 (FIG. 6). In addition, when the carrier arm 17 is at the position to regulate clockwise rotation, the planet gear 18 engages with a spur gear portion 24a of the double-gear 24 (FIG. 8). Furthermore, when the planet gear 18 rotates counterclockwise without being regulated by the carrier arm 17, the planet gear 18 engages with a large-diameter gear portion 22a of the double-gear 22 (FIG. 7).

Here, it is assumed that the double-gear 31 is composed of a spur gear portion 31a and a helical gear 31b, the double-gear 22 is composed of a large-diameter gear portion 22a and a small-diameter gear portion 22b, and the double-gear 24 is composed of a spur gear portion 24a and a bevel gear portion 24b.

In addition, it is assumed that detection of a rotational position of the carrier arm 17 is performed by detecting a reflector, mounted in the carrier arm 17, with a clutch photo-reflector (hereafter referred to as a clutch PR and identified in FIG. 10 as CLPR) 19.

The small-diameter gear portion 22b of the double-gear 22 with which the planet gear 18 can engage engages with the large-diameter gear portion 23a of the double-gear 23. Furthermore, the small-diameter gear portion 23a of the double-gear 23 engages with a gear (not shown) provided in a spool shaft 9 (FIG. 1) of the spool chamber.

The bevel gear portion 24b of the double-gear 24 with which the planet gear 18 can engage engages with a bevel gear portion 25a of a double-gear 25 composed of the bevel gear portion 25a and a spur gear portion 25b. Furthermore, the spur gear portion 25b of the double-gear 25 engages with a spur gear 26.

A worm 28 is fixed to one end of a shaft 27, to which the spur gear 26 is also fixed at the opposite end thereof. The worm 28 engages with a worm wheel 29. Furthermore, the worm wheel 29 engages with a rewind (hereafter referred to as RW) gear 30. An RW fork 30a is connected to the RW gear 30 so as to be capable of freely moving in and out thereof under the influence of a spring 30b.

In addition, the shaft 27 to which the spur gear 26 and worm 28 are fixed is mounted in the lower connecting member 6, and the worm wheel 29 and RW gear 30 are located in the cartridge chamber unit 2.

The helical gear portion 31b of the double-gear 31 with which the planet gear 18 can engage engages with an idle gear 32 (FIG. 4A). The idle gear 32, as shown in FIG. 4A, engages with a helical gear 33a of a double-gear 33 composed of the helical gear 33a and a sun gear 33b. The sun gear 33b of the double-gear 33 engages with three planet gears 35.

The planet gears 35 are rotatably supported by a carrier-Z 36 having a spur gear 36a, and engage with an internal gear portion 34a of an internal and external gear 34 composed of the internal gear portion 34a and an external gear portion 34b. In addition, the sun gear portion 33b, planet gear 35, carrier-Z 36, and internal and external gear 34 constitute a planet reduction gear mechanism (this mechanism is also called a differential drive mechanism).

The external gear portion 34b of the internal and external gear 34 engages with a large-diameter gear 37a of a double-gear 37 composed of the large-diameter gear 37a and a small-diameter gear 37b. Furthermore, the small-diameter gear 37b of the double-gear 37 engages with a spur gear 38a of a feed screw 38 composed of the spur gear portion 38a and a feed screw portion 38b. A nut 39 is thread-connected to the feed screw portion 38b, and a strobe device is driven by moving operation of the nut 39.

In addition, the respective members from the double-gear 31 to the nut 39 are mounted in the spool chamber unit 1.

The external gear 34b of the internal and external gear 34 engages with a spur gear portion 40a of a double-gear 40 composed of the spur gear 40a and a worm 40b. Furthermore, the worm 40b of the double-gear 40 engages with a worm wheel portion 41a of the double-gear 41 composed of the worm wheel portion 41a and a spur gear portion 41b. The spur gear portion 41b engages with a long gear 42 for driving the zoom lens barrel 71 as will be described later. By rotation of the long gear 42, the zoom lens barrel is driven forward from and backward to a retracted position of the zoom lens barrel 71.

In addition, the double-gears 40 and 41 are mounted in the lower connecting member 6. Furthermore, the long gear 42 is supported by the zoom lens barrel 71 built in the body 5 of the lens barrel unit.

The spur gear portion 36a of the carrier-Z 36 engages with a spur gear 43 to which a shaft 44 is fixed. A spur gear 45 is fixed to the shaft 44. A spur gear 45 engages with a spur gear portion 46a of a double-gear 46 composed of the spur gear portion 46a and a worm portion 46b. Furthermore, the worm portion 46b engages with a worm wheel portion 51a of a double-gear 51 composed of the worm wheel portion 51a and a spur gear portion 51b.

By providing a helix angle between the worm portion 46b and worm wheel portion 51a at an angle that blocks driving from the worm wheel portion 51a, the zoom lens barrel 71 does not move even if an external force is applied to the zoom lens barrel 71. In addition, the gear train is not burdened. Furthermore, although the helix angle changes according to a value of a friction coefficient, it is recommended that the helix angle is formed to be 82° or more if the friction coefficient between the worm portion 46b and worm wheel portion 51a is, for example, 0.10.

The spur gear portion 51b engages with a long gear 52 for driving the zoom lens barrel 71 that will be described later. By rotation of this long gear 52, the zoom lens barrel 71 is driven.

In addition, the worm portion 46b engages with a worm wheel 48 to which a shaft 49 is fixed, and a helical gear 50 for driving a finder is fixed to the shaft 49. Through this helical gear 50, the finder is driven.

Furthermore, the spur gear 43, and double-gears 46 and 51 are mounted in the lower connecting member 6. Moreover, the long gears 42 and 52 are built in the zoom lens barrel 71 inside the body 5 of the lens barrel unit.

Figure 9A:
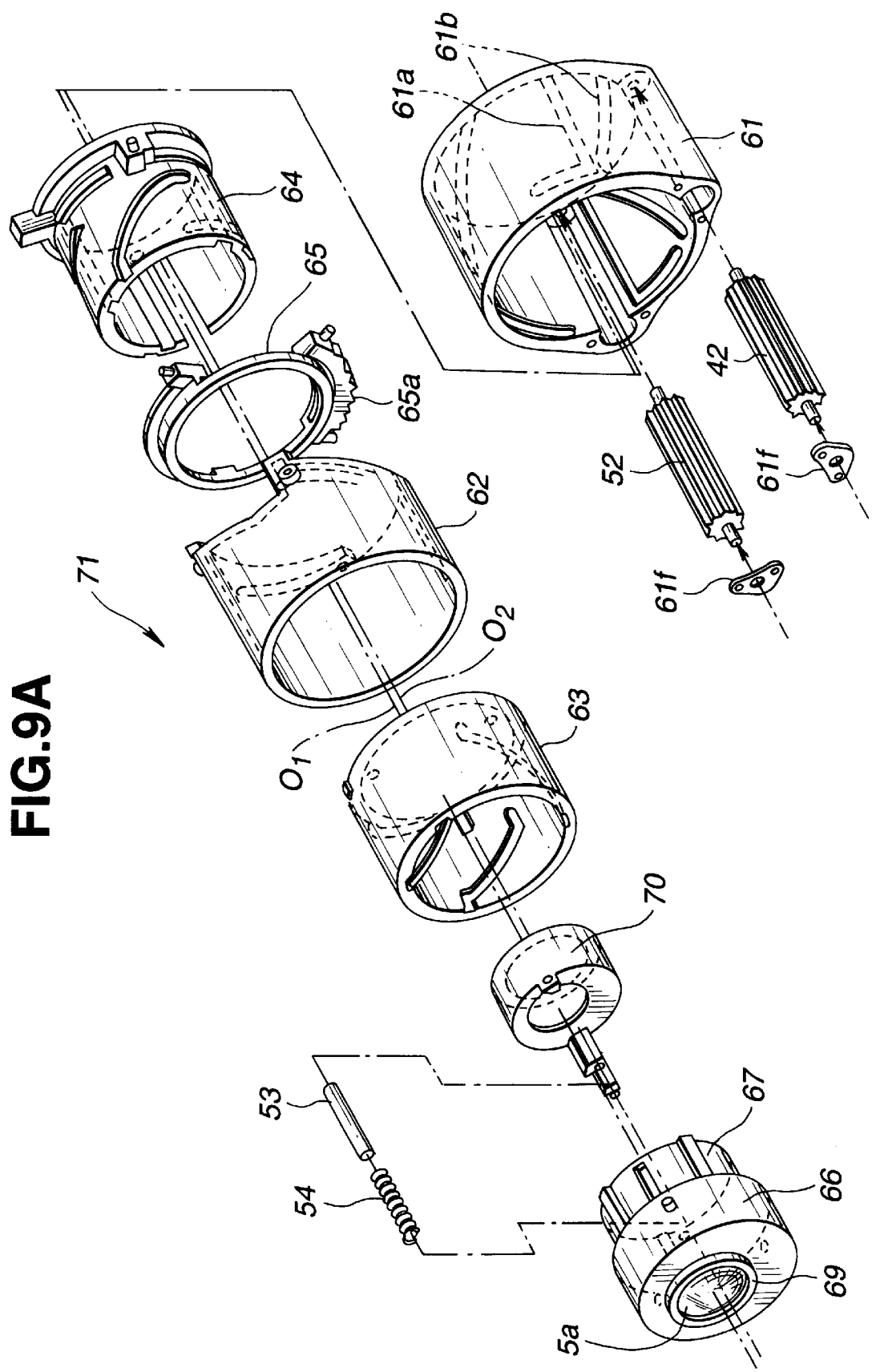
FIG. 9A is an exploded perspective view showing a zoom lens barrel provided in the camera of the above-described embodiment.
Figure 9B:
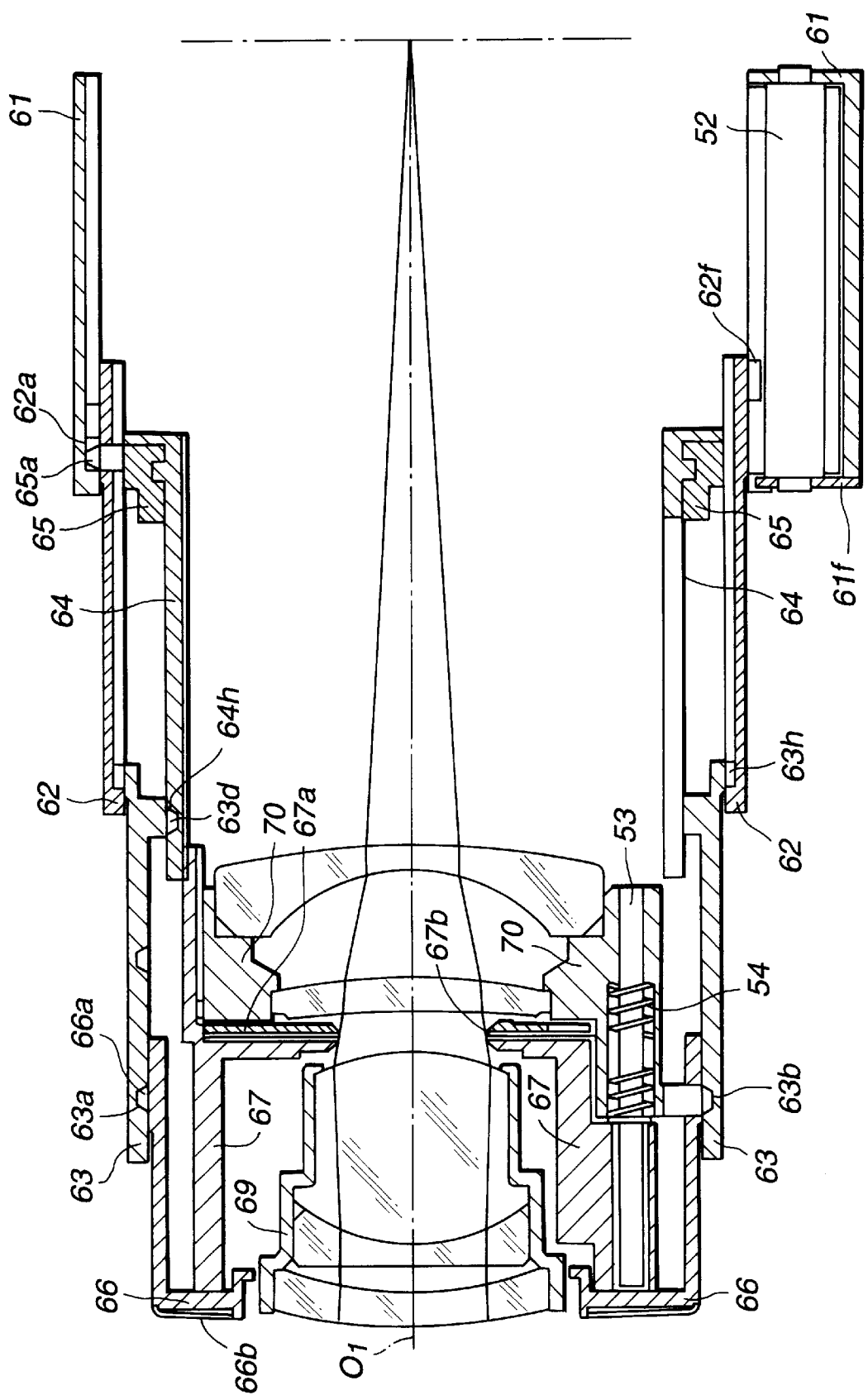
FIG. 9B is a sectional view showing the assembly of the zoom lens barrel of the camera of the above-described embodiment.

Next, the construction of the zoom lens barrel 71 provided in the body 5 of the lens barrel unit of the camera (FIG. 1) according to this embodiment will be described with reference to an exploded perspective view shown in FIG. 9A and a sectional view showing an assembled state in FIG. 9B.

The zoom lens barrel 71 is composed of elements around a moving frame and elements around a cam frame. The elements around the moving frame a fixed frame 61 that is fixed to and supported mainly by the camera body and the like; a moving frame 62 that is located inside the fixed frame 61 and which also can advance therefrom and retreat thereinto, and can rotate within the fixed frame 61; a float key 64 that is guided by the fixed frame 61 and is driven forward and backward simultaneously with the moving frame 62 without rotating; a set frame 65 that is driven freely in the rotational direction and as a unit in the back-and-forth direction; a long gear 42 that is driven through the driving-force transfer mechanism and rotationally drives the set frame 65; and a long gear 52 that is driven through the driving-force transfer mechanism and rotationally drives the moving frame 62. In addition, in FIG. 9A, symbol $O_1$ represents the optical axis of the picture-taking lens, and symbol $O_2$ represents the central axis of the lens barrel frame.

In addition, the moving frame 62 can advance and retreat between the retracted position in which the moving frame 62 is contained in the fixed frame 61, and a picture-taking or setup position. Furthermore, the moving frame 62 is rotationally driven when zooming is effected. Moreover, one end of each of the long gears 42 and 52 is supported in the fixed frame 61 by a respective pressure plate 61f.

The elements around the cam frame include the cam frame 63 whose rotational direction is guided mainly by the moving frame 62 and which is driven back and forth by a cam 64h of the float key 64; a first group zoom frame (hereafter referred to as a 1Z frame) 66 whose rotational direction is guided mainly by the float key 64 and which is driven back and forth by a cam 63a of the cam frame 63; a shutter body (hereafter referred to as an S body) 67 that is driven back and forth in one piece with the 1Z frame 66 and whose rotational direction is guided by the float key 64 to consequently regulate the rotation of the 1Z frame 66; a first group lens holding frame (hereafter referred to as a 1G frame) 69 that is supported by the 1Z frame 66 and supports a first group lens of the picture-taking lens 5a; and a second group lens holding frame (hereafter referred to as a 2G frame) 70 that is slidably supported by the S body 67, is driven back and forth by a cam of the cam frame 63, and supports a second group lens of the picture-taking lens 5a.

In addition, the 2G frame 70 is supported by the shaft 53 so as to be capable to moving in the direction of the optical axis and is in contact with a cam 63b of the cam frame 63 via a spring 54. The rotational driving of the moving frame 62 for effecting the zooming operation is performed by rotating the long gear 52. The long gear 52 is held by the fixed frame 61 and corresponds to a traversable length of a set operation. Furthermore, long gear 52 has a spur-shape which is long in the axial direction, and rotates the moving frame 62 connected to the gear 52 through a gear 62f.

The back-and-forth operation of the moving frame 62 between the retracted position and the projected position for setup and shutdown is effected by performing rotational driving and back-and-forth driving of the set frame 65.

Thus, the long gear 42, which is rotatably held by the fixed frame 61, sufficiently corresponds to a traversable length of a set operation. Additionally, long gear 42 has a spur-shape which is long in the axial direction, and is rotated by the spur gear portion 41b (FIG. 4A). Furthermore, the set frame 65 is moved along the direction of the optical axis $O_1$ with the guidance of cam 61b of the fixed frame 61 by rotating the frame 65 through the gear 65a engaging with the long gear 42. Then, the moving frame 62 is driven back and forth in accordance with this movement.

Figure 10:
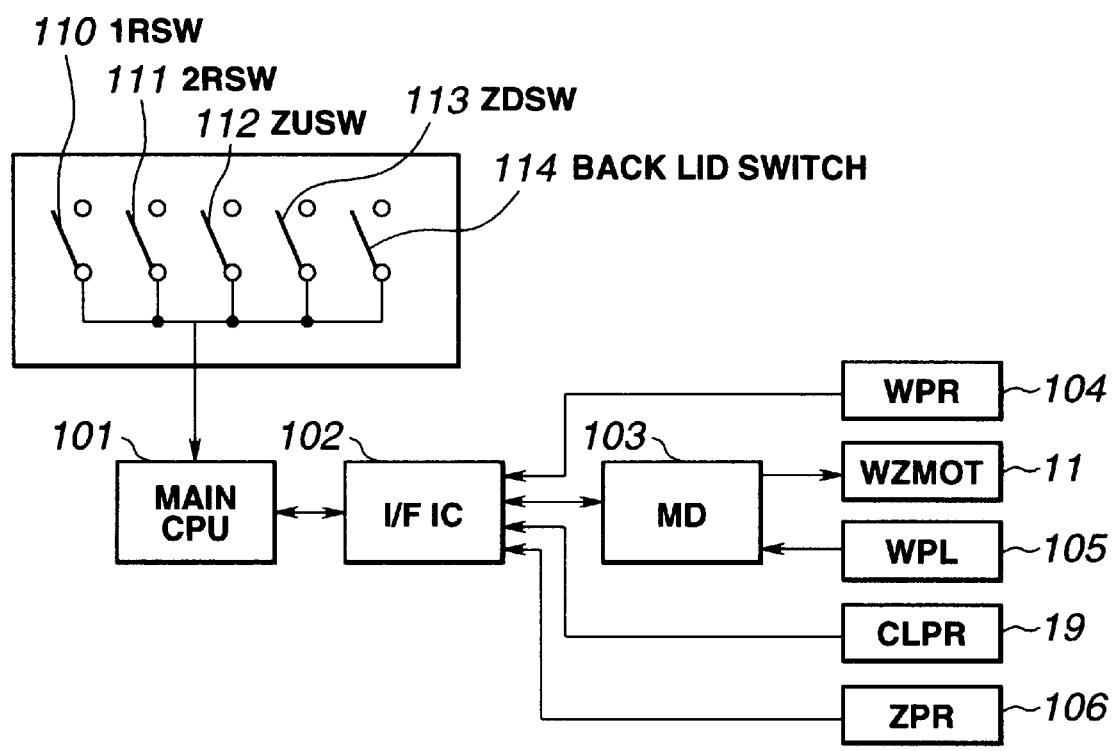
FIG. 10 is a block diagram showing a main part of an electrical control circuit section of the camera of the above-described embodiment.
Figure 11:
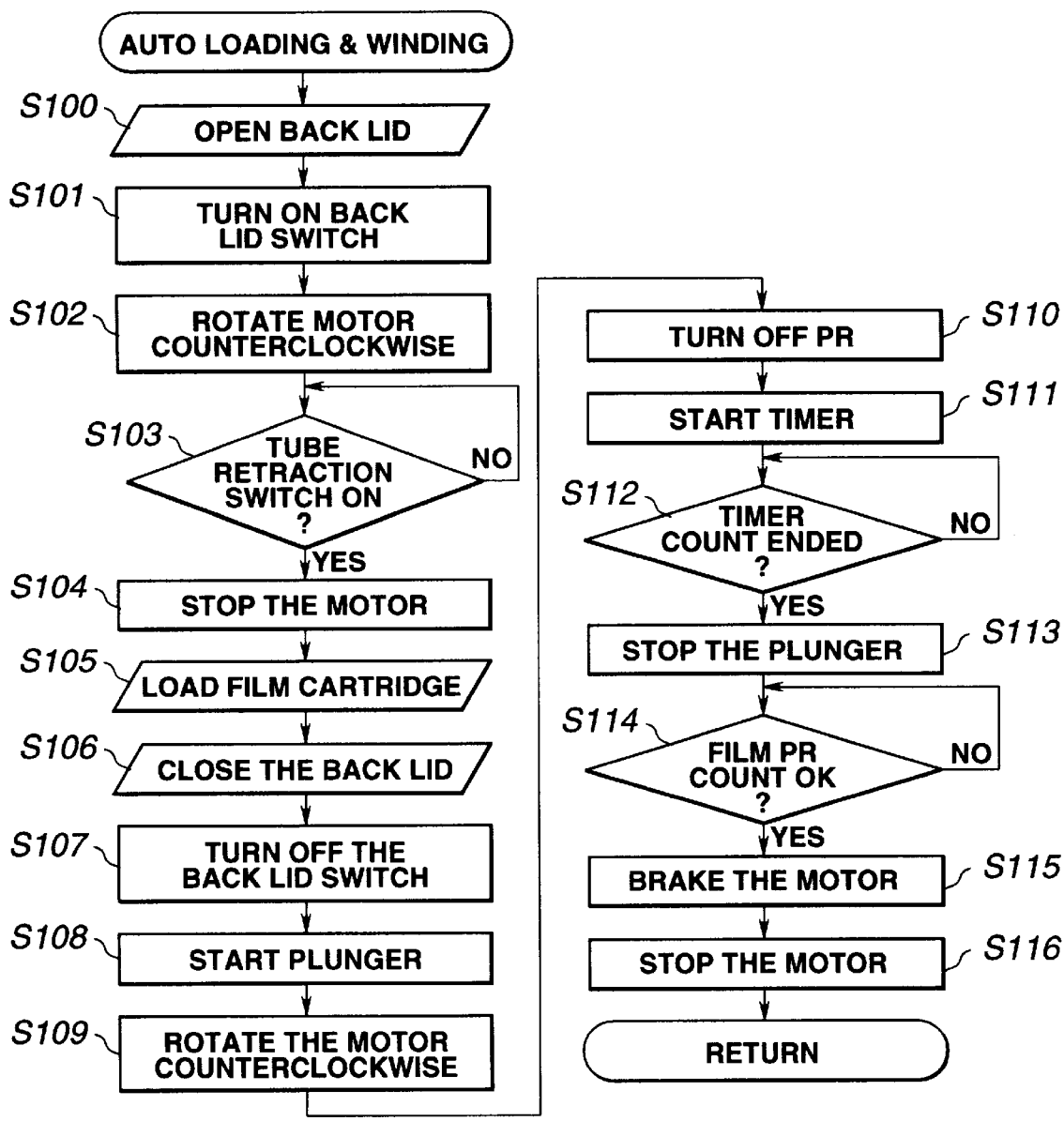
FIG. 11 is a flow chart showing auto film-loading and film windup processing in the camera of the above-described embodiment.
Figure 12:
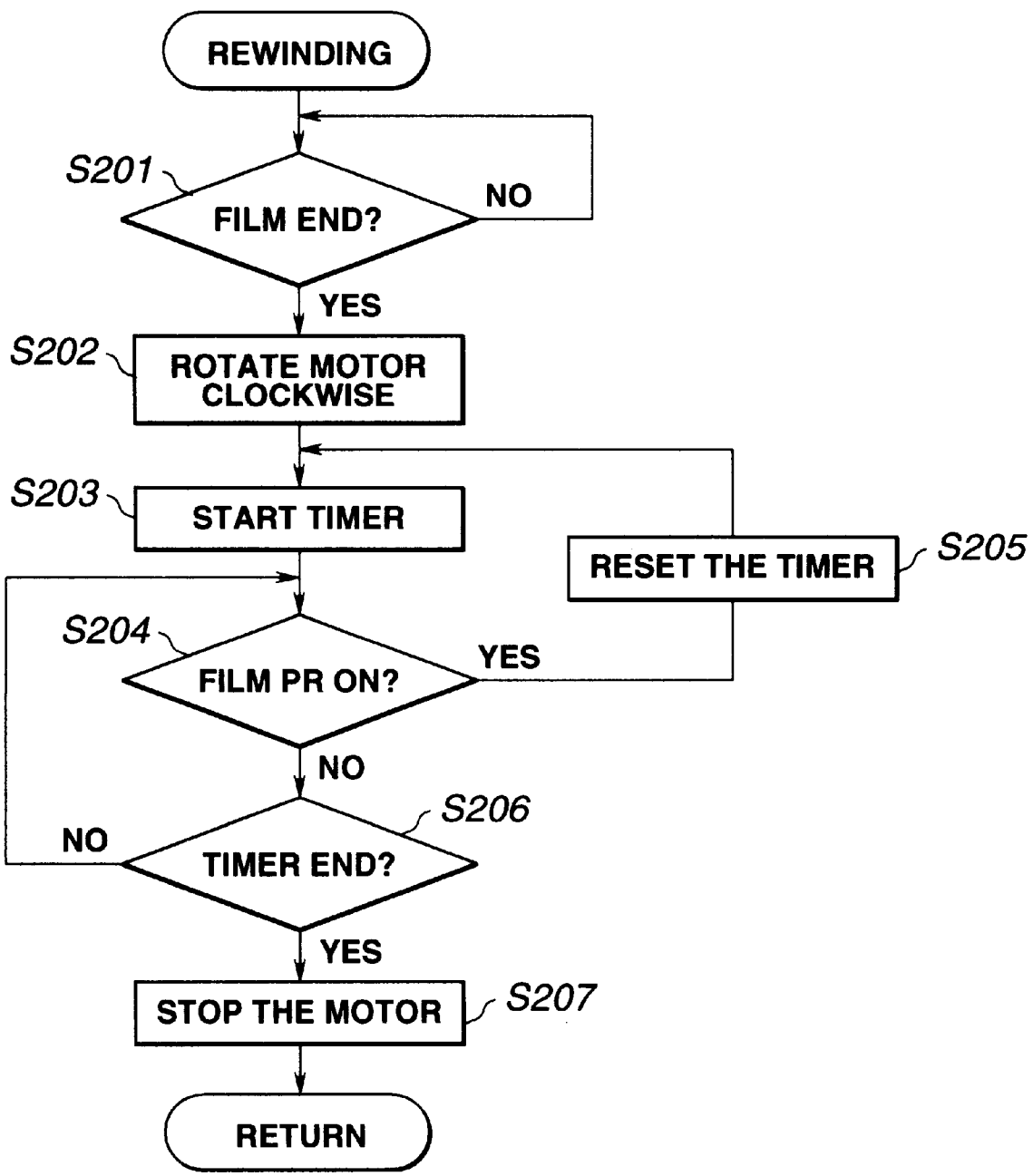
FIG. 12 is a flow chart showing film rewind processing in the camera of the above-described embodiment.

FIG. 10 is a block diagram showing a main part of an electrical control circuit section of the camera of this embodiment.

The electrical control circuit section of the camera includes a main CPU 101 controlling the entire camera control system; an interface IC (I/F IC) 102 interfacing between a motor driver and a photo-reflector; a driving motor driver (MD) 103; a driving motor (WZMOT) 11 serving as the driving source for the zoom, setup, film-feed, and other functions in the camera; a sensor (WPL) 105 for detecting the rotation of the driving motor 11; a film photo-reflector (hereafter referred to as a film PR and identified in FIG. 10 as WPR) 104 for counting perforations on a film that is fed therethrough; a clutch photo-reflector (hereafter referred to as a clutch PR and identified in FIG. 10 as CLPR) 19 for detecting a rotational position of a carrier arm in a change-over mechanism; a zoom photo-reflector (hereafter referred to as a zoom PR and identified in FIG. 10 as ZPR) 106 for detecting the extent to which the lens barrel 71 has been zoomed in or out; a first stage release switch (1RSW) 110 and a second stage release switch (2RSW) 111 that are used for signaling the start of a picture-taking operation; a zooming-in switch (ZUSW) 112 for signaling a zoom-in operation; a zooming-out switch (ZDSW) 113 for signaling a zoom-out operation.

Next, the respective processing operations of the camera of this embodiment that is controlled by the main CPU 101 will be described.

First, processing for auto-loading and windup of a cartridge of film will be described with reference to a flowchart in FIG. 11 and FIGS. 3 through 9B. When a back lid is opened at steps S100 and 101, an ON signal from a back lid switch 114 is generated. The driving motor 11 is rotated counterclockwise at step S102. The rotation of the driving motor 11 is transferred from the double-gear 31 to the idle gear 32.

Then, the set gear 42 is driven through a driving gear train, the lens frame of the picture-taking lens barrel 71 is retreated to the fully retracted position, and further, the strobe device is moved from a popup position to a retracted position.

When a retraction switch (not shown) turns on at step S103, the driving motor 11 is stopped at step S104. Then, a film cartridge is loaded and the back lid is closed at steps S105 and S106.

An OFF signal of the back lid switch is outputted at step S107, and the plunger 21 is turned ON at step S108. Since the clutch lever 20 rotates, the pin 20a is unclutched, and hence the carrier arm 17 and planet gear 18 can revolve.

The driving motor 11 is rotated counterclockwise at step S109, and the carrier arm 17 and planet gear 18 begin to turn. When it is detected at step S110 that the carrier arm 17 rotates to a predetermined position, the clutch PR 19 turns off, and a timer (not shown) starts counting at step S111.

After the end of the timer counting process is confirmed at step S112, the plunger is turned off at step S113, and the clutch lever 20 returns to a position where clutching is possible. The planet gear 18 further revolves to engage with the large-diameter gear 22a of the double-gear 22 as shown in FIG. 7. Then, the film windup process is started in the spool shaft 9 (FIG. 1) of the spool chamber with the double-gear 23 engaging with the double-gear 22. At the same time, perforations in the film are counted during film windup by the film PR 104.

After detecting a predetermined number of perforations at step S114, the driving motor 11 is braked at step S115. The driving motor 11 is stopped at step S116, and the autoloading and windup of the film is completed.

Next, a process for film rewind in the camera of this embodiment will be described with reference to the flow chart in FIG. 12, FIGS. 3 through 9B, and the like.

First, when the end of the film is detected at step S201, the driving motor 11 is rotated clockwise at step S202. By this rotation, the planet gear 18 is rotated to engage with the spur gear 24a of the double-gear 24 as shown in FIG. 8. Since the rotation of the double-gear 24 is transferred to the RW gear 30, the film rewind process is started. At the same time, a timer (not shown) starts counting at step S203.

If a film perforation is detected by the film PR 104 at step S204 and an output signal indicates an ON state, the process jumps to step S205 to reset the timer. Furthermore, the process returns to step S203 to restart the counting by the timer.

If it is detected at step S204 that the output signal from the film PR 104 does not indicate an ON state because the end of the film rewind process has been reached, the process goes to step S206. If it is detected there that the predetermined count by the timer has ended, the process goes to step S207. Driving of the driving motor 11 is stopped at step S207, and the film rewind is completed.

Next, setup processing in the camera of this embodiment will be described with reference to the flow chart in FIG. 13, FIGS. 3, 4A, 4B, 9A and 9B, and the like.

First, it is judged at step S301 whether a barrier switch (not shown) doubling as a power switch is turned on in conjunction with the opening of a lens barrier. If the switch is turned ON, the driving motor 11 is rotated clockwise at step S302. Since the double-gear 31 rotates in conjunction with the rotation of the driving motor 11, the feed screw 38 rotates through the gear train, and hence the nut 39 moves, causing the strobe device to pop up. Furthermore, the long gear 42 rotates through the gear train, the set frame 65 of the zoom lens barrel 71 shown in FIG. 9A rotates, and hence respective lens frames such as the moving frame 62 along a cam groove 61d of the fixed frame 61 are advanced to set up the camera. During these operations, the moving frame 62 engaging with the long gear 52 is locked in the rotational direction by a cam groove 61a inside the fixed frame 61, and hence mechanisms from the carrier-Z 36 to the long gear 52 that is a part of the driving-force transfer mechanism are kept in the state of being incapable of rotation.

The zoom PR 106 is turned ON at step S303. After that, when the cam frame 63 is advanced by a predetermined amount, the rotation of the cam frame 63 is blocked by a cam groove 61b of the fixed frame 61. On the other hand, since the moving frame 62 is released from rotational regulation by the cam groove 61a of the fixed frame 61, mechanisms from the carrier-Z 36 to the long gear 52 and the moving frame 62 becomes rotatable. Then, the zoom PR 106 turns off at step S304, and the setup of the camera is completed. The driving motor 11 is braked and stopped at steps S305 and S306, respectively. Thereafter, the zoom operation is performed by rotating the driving motor 11 clockwise or counterclockwise by turning on or off the zooming-in switch 112 or zooming-out switch 113.

As described above, according to the camera of this embodiment, assembly is completed by connecting constitutive units, composed of constitutive elements having simple shapes, with screws in the camera body. Therefore, it is possible not only to contribute to the increase of productivity of cameras but also to facilitate correspondence with model changes and the like by utilizing commonization of respective elements.

For example, when a model change or the like is performed, it is possible to adapt the camera by merely changing the design of the length of the rail member 3, connection reinforcing member 4, lower connecting member 6, and shafts 27 and 44 if it becomes necessary to change the gap between the spool chamber and cartridge chamber.

In addition, since the rail member 3, connection reinforcing member 4, and lower connecting member 6 are formed with elements having simple and approximately tabular shapes, it is possible not only to contribute to the ease of manufacture of each part but also to the reduction of production costs thereof.

Furthermore, by forming the connection reinforcing member 4 and lower connecting member 6 as one piece in the camera body, it is possible to only to easily provide stiffness of the entire camera body but also to realize a construction which is not affected by external forces being transferred to the internal mechanisms.

Moreover, it is possible to perform checking, adjustment, and the like of a picture-taking optical system with the body 5 of the lens barrel unit, which holds the picture-taking lens 5a, being connected to the rail member 3. Hence, this is advantageous for quality assurance, transportation, and the like.

In addition, planar contact faces having predetermined areas respectively are provided in the connecting sections between constitutive units constructing the camera body, connecting sections between the connection reinforcing member 4, lower connecting member 6, and respective constitutive units. Furthermore, these contact faces are fixed with screws to connect respective contact faces with each other. Therefore, it is possible to connect respective constitutive members by stabilizing the relationship between respective constitutive members.

Furthermore, since the rail member 3 and the body 5 of the lens barrel unit are connected with screws to connect respective contact faces 3d and 5d, it is possible to stably secure positioning of the rail member 3 to the optical axis $O_1$ of the picture-taking lens 5a. Due to this feature, it is possible to excellently maintain the positional relationship between an image plane of a subject image by the picture-taking lens 5a and the guide rails (not shown) of the rail member 3. Therefore, it is possible to locate a film plane in parallel to the image plane.

Moreover, the connection reinforcing member 4 and spool chamber unit 1 are connected with screws to connect the contact face 3b and a contact face of the connection section 1b. In addition, the rail member 3 and spool chamber unit 1 are connected with screws to connect respective contact faces 3b and 1a. Hence, it is possible to securely receive with the rail member 3 the film tension produced between the spool chamber and cartridge chamber at the time of film windup and rewind. Therefore, it is possible maintain flatness of the film plane. Moreover, it is possible to absorb size errors between the contact faces 5c and 5d of the rib section 5h in the body 5 of the lens barrel unit and the contact face 5b of the lens barrel mounting-plate 5f, in the direction of the optical axis $O_1$ without distortion.

In addition, the connection reinforcing member 4 can be used for connecting the camera body of the camera of this embodiment to, for example, other constitutive units of the camera such as an exterior member. In this case, it is possible to easily keep positional accuracy between the constitutive units such as the exterior member and respective constitutive units in the camera body such as the body 5 of the lens barrel unit, spool chamber unit 1, and cartridge chamber unit 2.

Furthermore, since the exterior members and respective constitutive units (in particular, the rail member 3) of the camera body are not connected directly, external forces applied to the exterior members hardly affect the rail member 3. Therefore, it is easy to prevent deformation of the guide rails and the like.

As described above, a main part such as the worm gear of the driving-force transfer mechanism is further assembled in the lower connecting member 6 where respective constitutive units are assembled.

In this manner, since the respective constitutive units including the constitutive mechanism units are assembled separately from each other, any specification changes for a constitutive unit hardly affects the other constitutive units. Therefore, since it is possible to incorporate the unchanged constitutive units as presently designed, it is very convenient not only in production planning but also functionally. Furthermore, this is also suitable for partial assembly of every constitutive unit from the viewpoint of assembly procedure.

Moreover, the lower connecting member 6 can be constructed so that the member 6 may be located on the upper side of the camera body. In this case, the lower connecting member 6 can be doubled for use as a base plate for a finder unit and an AF unit, and can also be used as a mounting pedestal for locating these respective constitutive units.

As described above, in the camera of the present invention, the lens barrel unit, cartridge chamber unit, spool chamber unit, and driving-force transfer mechanism are mounted in the connecting member directly or indirectly. Therefore, it is possible to accommodate a specification change of each constitutive unit or a driving-force transfer mechanism by changing only the unit having the changed specifications while the other units may be incorporated without change. Furthermore, assembly work becomes easy because partial assembling is possible.

In addition, since worm gears are provided in the driving system of the driving-force transfer mechanism, it is possible to drive the different driven sections from the drive change-over section using driving shafts without applying a gear train to combine multistage gears.

What is claimed is:

1. A camera for taking a subject image on a film with an image pickup lens, comprising:

a driving source for providing a driving force;

a spool chamber unit having a film spool chamber and a first driving-force transfer section for winding the film;

a cartridge chamber unit having a cartridge chamber where a film cartridge is loaded and a second driving-force transfer section for rewinding the film;

a lens barrel unit having in a fixed frame a third driving-force transfer section for freely driving back and forth a lens holding barrel which holds the image pickup lens; and a connecting member having a driving-force transfer mechanism for transferring the driving-force of the driving source upon connecting to the second and third driving-force transfer sections, wherein when the spool chamber unit, cartridge chamber unit, and lens barrel unit are dismountably mounted to the connecting member directly or indirectly, the second and third driving-force transfer sections are connected to the driving-force transfer mechanism; and wherein if any unit is dismounted from the connecting member, connection between the driving-force transfer mechanism and the corresponding driving-force transfer section of the unit dismounted is released.

2. A camera according to claim 1, wherein the driving-force transfer mechanism has a driving-force transfer shaft.

3. A camera according to claim 1, wherein the connecting member has one surface at which the spool chamber unit, cartridge chamber unit, and lens barrel unit are mounted, and another surface at which a driving-force transfer shaft of the driving-force transfer mechanism is located.

4. A camera according to claim 1, wherein the spool chamber unit includes:

a differential drive mechanism that is located between the lens barrel unit and the spool chamber unit and transforms the driving-force inputted from the driving source into an output for setup operation and zoom operation of the lens barrel unit.

5. A camera that can take a picture on a film by performing a setup operation and a zoom operation of a picture-taking lens upon changing an output of a single driving source, comprising:

a spool chamber unit having a driving source, a film spool chamber, and a film windup section;

a cartridge chamber unit having a cartridge chamber into which a film cartridge is loaded, and a film rewind section;

a lens barrel unit having a fixed frame holding the picture-taking lens so that the picture-taking lens can advance and retreat freely, and a back-and-forth drive section for advancing and retreating the picture-taking lens; and a connection member having a driving-force transfer mechanism for transferring an output of the driving source to at least the film rewind section and the back-and-forth drive section of the picture-taking lens, wherein the spool chamber unit, cartridge chamber unit, and lens barrel unit are dismountably mounted to the connection member directly or indirectly, and when the spool chamber unit, cartridge unit and lens barrel unit are mounted to the connection member, the film windup section, film rewind section, and back-and-forth drive section are connected to the driving-force transfer mechanism respectively.

6. A camera comprising:

a driving source;

a lens barrel unit supporting a picture-taking lens for driving a picture-taking lens system;

a cartridge chamber unit having a cartridge chamber into which a film cartridge is loaded, and a film rewind section;

a spool chamber unit having a film spool chamber and a film windup section; and a connecting unit for transferring a driving-force of the driving source to a drive section for a picture-taking lens optical system and the film rewind section;

wherein the lens barrel unit, cartridge chamber unit, and chamber unit are easily dismountable from the remaining units of the camera so as to be readily exchanged or replaced.

7. A camera according to claim 6, wherein the cartridge chamber unit and spool chamber unit are located on the connecting unit such that the lens barrel unit is disposed between the cartridge chamber unit and the spool chamber.

8. A camera according to claim 6, wherein the connecting unit includes a worm gear.

9. A camera according to claim 6, wherein the connecting unit includes a shaft.

10. A camera according to claim 8, wherein the worm gear has a helix angle that blocks driving from a worm wheel engaging with the worm gear.

11. A camera according to claim 10, wherein the worm gear and worm wheel are formed as helical gears which cross each other.

12. A camera comprising:

a spool chamber;

a first mechanism unit having a gear mechanism attached to the spool chamber;

a cartridge chamber;

a second mechanism unit having a gear mechanism attached to a cartridge chamber;

a lens frame;

a third mechanism unit having a gear mechanism attached to the lens frame;

a driving source section having a motor and a gear mechanism for transferring a driving-force therefrom for driving the first, second, and third mechanism units; and a connecting unit for transferring the driving-force of the driving source section to at least the second mechanism unit, wherein the spool chamber, cartridge chamber, and lens frame are easily dismountable from the remaining units of the camera so as to be readily replaced or exchanged, wherein the first, second, and third mechanism units, and connecting unit can be separated from each other, and wherein the first, second, and third mechanism units perform substantial and respectively separate functions.

13. A camera according to claim 12, wherein the driving source section is included in the first mechanism unit.

14. A camera comprising:

a first mechanism unit including a spool chamber and a gear mechanism attached to the spool chamber;

a second mechanism unit including a cartridge chamber and a gear mechanism attached to the spool chamber;

a driving source section for driving the first and second mechanism units; and a connecting unit for transferring a driving-force of the driving source section to at least the second mechanism unit, wherein the spool chamber and cartridge chamber are each easily dismountable from the remaining units of the camera so as to be readily exchanged or replaced;

wherein the first and second mechanism units and the connecting unit can be separated from each other, and wherein the first and second mechanism units perform substantial and respectively separate functions.

15. A camera according to claim 14, wherein the driving source section includes a motor and a gear mechanism for transferring the driving-force.

\* \* \* \* \*